US009491527B2

(12) United States Patent
Sanita et al.

(10) Patent No.: US 9,491,527 B2
(45) Date of Patent: Nov. 8, 2016

(54) COMMUNICATION NETWORK

(75) Inventors: Laura Sanita, Pescara (IT); Gianpaolo Oriollo, Rome (IT); Paola Iovanna, Rome (IT); Roberto Sabella, Rome (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 739 days.

(21) Appl. No.: 12/919,477

(22) PCT Filed: Jul. 21, 2008

(86) PCT No.: PCT/EP2008/059528
§ 371 (c)(1),
(2), (4) Date: Apr. 4, 2011

(87) PCT Pub. No.: WO2009/106153
PCT Pub. Date: Sep. 3, 2009

(65) Prior Publication Data
US 2011/0176438 A1   Jul. 21, 2011

(30) Foreign Application Priority Data

Feb. 29, 2008 (EP) ..................... 08152182

(51) Int. Cl.
*H04L 12/18* (2006.01)
*H04Q 11/00* (2006.01)
*H04J 14/02* (2006.01)
(Continued)

(52) U.S. Cl.
CPC ......... *H04Q 11/0062* (2013.01); *H04J 14/025* (2013.01); *H04J 14/0227* (2013.01); *H04J 14/0246* (2013.01); *H04J 14/0295* (2013.01); *H04L 45/00* (2013.01); *H04L 45/22* (2013.01); *H04L 45/28* (2013.01); *H04L 45/50* (2013.01); *H04L 45/62* (2013.01); *H04L 45/64* (2013.01); *H04J 14/028* (2013.01); *H04J 14/0284* (2013.01); *H04Q 2011/0073* (2013.01); *H04Q 2011/0077* (2013.01); *H04Q 2011/0081* (2013.01)

(58) Field of Classification Search
CPC ....... H04L 45/22; H04L 45/28; H04L 45/00; H04L 45/24; H04L 45/50; H04L 45/02
USPC ........ 370/216–228, 229–235, 242–245, 252, 370/254, 351, 400, 401
See application file for complete search history.

(56) References Cited

U.S. PATENT DOCUMENTS

2005/0232157 A1   10/2005   Tyan et al.
2005/0271060 A1*  12/2005   Kodialam et al. ............ 370/394
(Continued)

OTHER PUBLICATIONS

PCT International Search Report, mailed Oct. 30, 2008, in connection with International Application No. PCT/EP2008/059528.
(Continued)

*Primary Examiner* — Yemane Mesfin
*Assistant Examiner* — Mon Cheri Davenport
(74) *Attorney, Agent, or Firm* — Leffler Intellectual Property Law, PLLC

(57) ABSTRACT

A method for determining routing for data which is to be transmitted over a multilayer network, the network comprising a first layer of nodes, and a second layer of nodes, and the method comprising determining routing by taking account of available signal transmission/processing resource associated with the first layer and available signal transmission/processing resource associated with the second layer.

19 Claims, 3 Drawing Sheets

(51) Int. Cl.
*H04L 12/701* (2013.01)
*H04L 12/707* (2013.01)
*H04L 12/703* (2013.01)
*H04L 12/723* (2013.01)
*H04L 12/721* (2013.01)
*H04L 12/715* (2013.01)

(56) References Cited

U.S. PATENT DOCUMENTS

2007/0183317 A1* 8/2007 Vasseur et al. ............. 370/225
2007/0286069 A1* 12/2007 Xu .............................. 370/218

OTHER PUBLICATIONS

Sabella, R.. et al. "A multilayer solution for path provisioning in new-generation optical/MPLS networks" Journal of Lightwave Technology, IEEE Service Center, New York, NY, US, vol. 21, No. 5, May 1, 2003, pp. 1141-1155, XP011098688, ISSN: 0733-8724.

Awduche, D. et al. "Multiprotocol Lambda Switching: Combining MPLS Traffic Engineering Control with Optical Crossconnects" IEEE Communications Magazine, IEEE Service Center, Piscataway, US, vol. 39, No. 3, Mar. 1, 2001, pp. 111-116, XP011091437, ISSN: 0163-6804.

Bhide, N. et al. "Routing Mechanisms Employing Adaptive Weight Functions for Shortest Path Routing in Optical WDM Networks" Journal of Photonic Network Communications, vol. 3, No. 3, pp. 227-236, 2001.

* cited by examiner

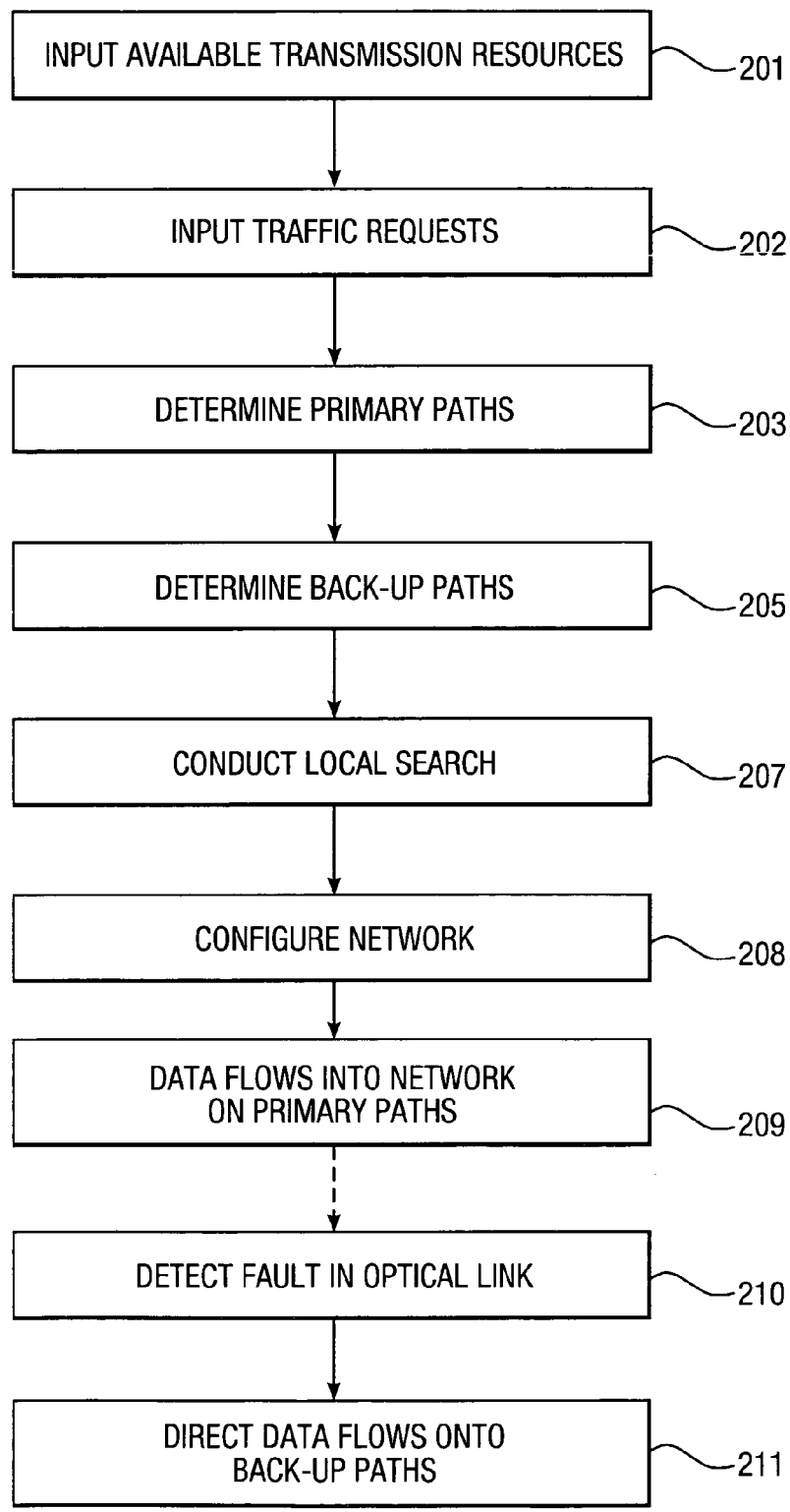

COMMUNICATION NETWORK

CROSS-REFERENCE TO RELATED APPLICATIONS

This application claims priority under 35 U.S.C. §119 to European Patent Application No. 08152182.5, filed Feb. 29, 2008, which is hereby incorporated herein by reference in its entirety

TECHNICAL FIELD

The present invention relates generally to communication networks.

BACKGROUND

Known telecommunication networks include fault management strategies. In essence, these provide routing details of alternative routes for data flows, in the event of a failed optical link. By providing an alternative route to bypass the failed link the network operator can achieve a required level of QoS as called for by a Service Level Agreement (SLA). In particular, data flows which have been designated as being of high priority can be provided with protection paths.

In one embodiment, the invention seeks to provide an improved telecommunications network.

SUMMARY

According to one aspect of the invention there is provided a method for determining routing for data which is to be transmitted over a multi-layer network. The network comprises a first layer of nodes, and a second layer of nodes, and the method comprising determining routing by taking account of available signal transmission/processing resource associated with the first layer and available signal transmission/processing resource associated with the second layer.

According to another aspect of the invention there is provided network management apparatus for a multi-layer network comprising a first layer of nodes, a second layer of nodes. The network management apparatus comprising a data processor which is arranged to determine routing by taking account of available signal transmission/processing resource associated with the first layer and available signal transmission/processing resource associated with the second layer Another aspect of the invention relates to machine-readable instructions for a data processor, and the instructions, when run by the data processor, result in routing for data which is to be transmitted across a multi-layer network. The network comprising a plurality of nodes of a first layer and a plurality of nodes of a second layer. The instructions being such that the data processor determines routing by taking account of available signal transmission/processing resource associated with the first layer and available signal transmission/processing resource associated with the second layer.

DESCRIPTION OF THE DRAWINGS

Various embodiments of the invention will now be described, by way of example only, with reference to the following drawings in which:
FIG. 4 shows a flow chart.

DETAILED DESCRIPTION

Figure 1:
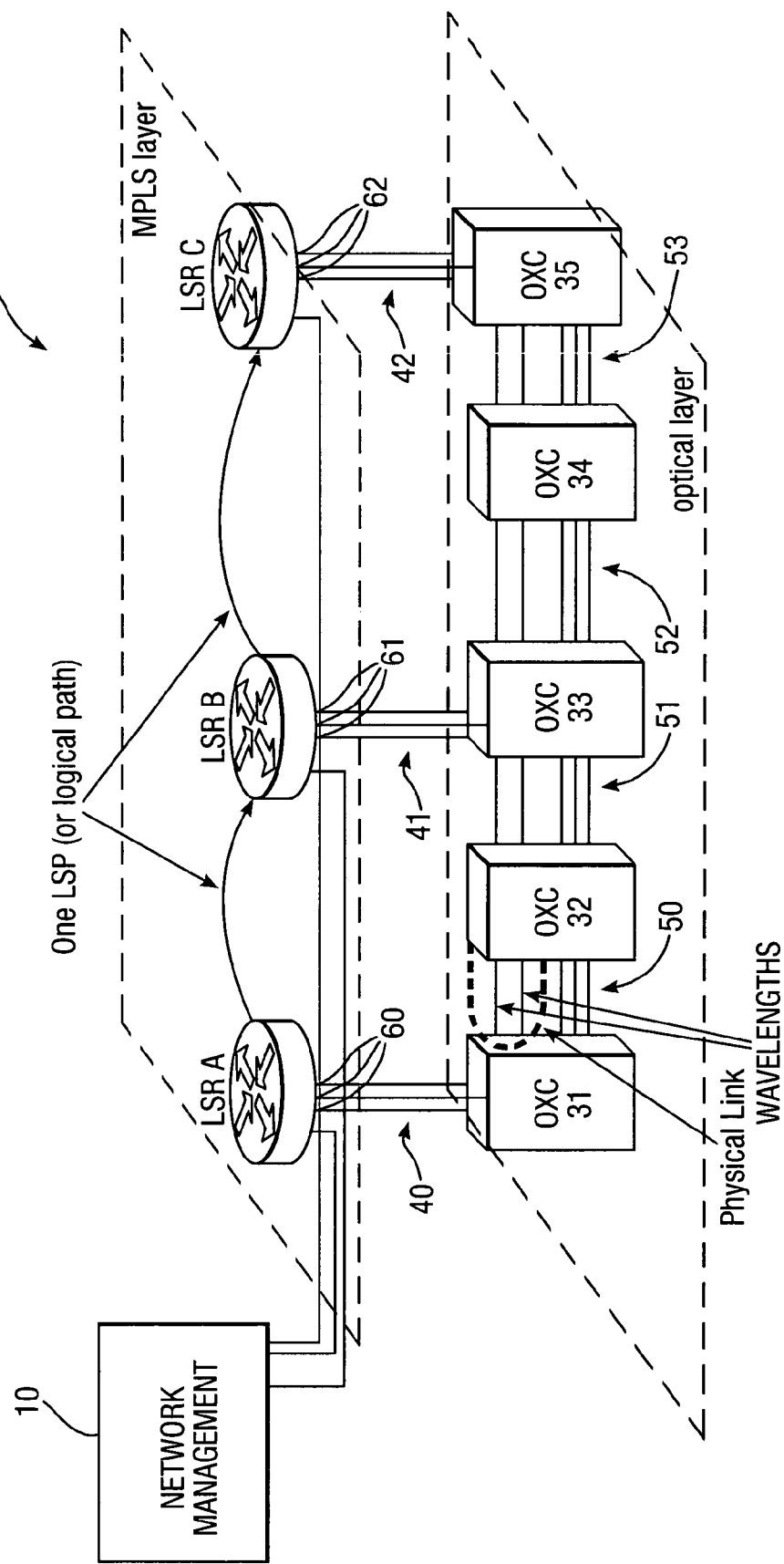
FIG. 1 shows a telecommunication network.

With reference initially to FIG. 1 there is shown a multi-layer network 1 comprising a plurality of Label Switched Routers (LSRs) A, B and C, and a plurality of Optical Cross-Connect switches (OXCs) 31, 32, 33, 34 and 35. The LSRs A, B and C form part of a Multi-Protocol Label Switched (MPLS) layer and the OXCs 31-35 form part of an optical layer. The OXCs are optical nodes, and the LSRs are electrical nodes. The LSRs are connected to the OXCs by optical links 50, 51, 52 and 53 by intra-node links 40, 41 and 42. Multiple wavelengths are capable of being transmitted on each optical link. A virtual connection established at MPLS layer is named the Label Switched Path (LSP). The MPLS layer forms a control plane and the optical layer uses Wavelength Division Multiplexing (WDM). Each LSR is essentially an ingress/egress node at the edge of the OXCs and the optical links Data flows in the electrical domain are received by an LSR (say LSR A), sent to a linked OXC (say OXC 31) and then sent to the linked LSR (say (LSR C), where the data flow is output in the electrical domain for onward transmission to its ultimate destination. In FIG. 1 the LSP connects LSR A, LSR B ad LSR C on the MPLS layer. The bandwidth of an LSP is the bandwidth of the traffic (i.e. the data flow) request that has to be accommodated in the network. On the optical layer the LSP is realized as the concatenation of lightpaths (e.g. the lightpath connecting OXC31 to OXC33 and the lightpath connecting OXC 33 to OXC 35). The bandwidth of a lightpath is the wavelength bandwidth, so multiple LSPs can be tunneled on a single lightpath.

The network 1 also comprises a network management apparatus 10. The apparatus 10 comprises a data processor and a memory, and by being provided with suitable machine-readable instructions is configured to implement what may be termed a routing engine which determines a plurality of primary paths and a plurality of back-up paths. The apparatus 10 is arranged to be able to communicate with each of the LSRs A, B and C. In this way the apparatus is able gather information from the network and effect suitable control signals to other components of the network. The inputs to the routing engine are the traffic matrix and the topology of the network 1. Each element of the traffic matrix is a vector representing a source LSR node, a destination LSR node, and the bandwidth needed for each traffic request. Other attributes in addition to the bandwidth can also be considered as well. The output produced by the apparatus 10 is the route for each traffic request represented as the LSP in terms of list of LSRs, the aggregation of each LSP in the optical layer in terms of list of OXCs and optical links, and the associated back-up paths for a failure on the network.

The concept of a failure scenario is now introduced. A scenario is associated with each failure event. Let S:={s0, . . . , sm} be the set of all scenarios, also including the working scenario s0 (i.e. zero failures). In each scenario, one is aware of the set of resources and the status of occupancy of each. Therefore, if a certain traffic request k uses a resource j only for a subset of scenarios, the same resource is available for other traffic requests for each scenario in the set. In other words, knowing in any moment and in any failure condition, what the available resources are that can be utilized to recover data paths, leads to an efficient use of network resources, thanks to a strong use of resource sharing.

For each optical link a failure scenario can be considered. If m is the number of optical links, then there are m failure scenarios and one working scenario. A traffic request is served if, and only if, it is routed in all scenarios; therefore, each served traffic request must be assigned to a logical path from its origin/source LSR to its destination LSR for each scenario, where a logical path is a sequence of lightpaths. The logical path is an LSP on a MPLS layer and it relates to a sequence of lightpaths in the optical layer. Trivially, an assignment is feasible, if, for each scenario and for each resource, the set of traffic requests using that resource does not exceed the availability (e.g. the bandwidth on a wavelength) of the resource.

The recovery base of the protection strategy is the lightpath, the granularity of the protection is defined by the LSP, and the back-up path depends on the specific link which has failed. Granularity relates to the size of a contiguous segment of data of a data flow. So, it is generally easier to find 'room' for a traffic request with fine granularity, as compared to a traffic request of coarse granularity. Moreover, an LSP is diverted from its working or primary path p only if an optical link of p fails. There are therefore some consistency constraints binding the paths that are assigned to a same LSP in different scenarios: they are described below.

Consider a scenario s associated with the failure of an optical link e. Let $L(s)$ be the set of lightpaths using e and $LSP(s)$ the set of LSPs using a lightpath of $L(s)$ in the working scenario. Considering that each LSP is associated uniquely to a traffic request trivially, $LSP(s)$ is the set of traffic requests that fail when e fails, so it is the set of LSPs needed to be recovered in the scenario s. Let k LSP(s) and $(l1, \ldots, lp)$ the working path of k, with e li. Let ui and uj be respectively the LSR origin and the LSR destination of li.

1) The recovery base of the strategy is the lightpath: that is, the back-up path of k has the form $(l1, \ldots, li-1, Q(k,s), li+1, \ldots, lp)$, where $Q(k,s)$ is a logical path from ui to uj (possibly, $Q(k,s)$ is made of a single lightpath, parallel to li).
2) The granularity of the strategy is defined by the LSP: therefore, if k' is another LSP in LSP(s) using li, then it may happen that $Q(k,s) \neq Q(k',s)$.
3) The back-up path depends on the link failed: in fact, by definition, $Q(k,s)$ depends both on the LSP k and on the scenario s (correspondent to the failed bi-directional link e). Therefore if $e' \neq e$ is another optical link used by li, and s' is the scenario correspondent to e', li will be failed also in s' and in general $Q(k,s) \neq Q(k,s')$. It will be appreciated, however, that instead of a bi-directional link, an asymmetrical link could be considered.
4) An LSP is diverted from its working path p only if some link of p fails: that is, if LSP k LSP(s), then k is still routed on its working path in the scenario s associated with the failure of e.

We consider now the situation of a set of traffic requests with high priority that has to be routed in the multi-layer network 1. The requests are known in advance of any of the data flows entering the network 1. and so the routing engine of the network control apparatus 10 determines the routing off-line. The objective of the routing engine is to serve as many traffic requests as possible. Failures may occur in the network; since each traffic request has high priority, it is served if and only if it is routed in the working scenario and in each failure scenario.

The purpose of the routing engine is therefore that of designing a set of lightpaths (i.e. the logical topology) and providing, for each traffic request, a logical path for the working scenario (i.e. a primary path) and for each failure scenario (i.e. a back-up path). Each lightpath—to be used in the working scenario and/or in some failure scenarios—is established in advance of data flows entering the network by suitably configuring the network's nodes.

Considering a general description of the multi-layer network 1, the network comprises a set $N=Nel \cup Nopt$ of nodes and a set $E=Eport \cup Eopt$ of links. $Nel=\{u1, u2, \ldots, un\}$ is the set of electrical nodes (i.e. the LSR's). $Nopt=\{v1, v2, \ldots, vn, vn+1, \ldots, vp\}$ is the set of optical nodes, (i.e. the OXC's), with full wavelength conversion capabilities.

Each LSR ui is linked to the OXC vi: this is represented by a set of intra-port links $Eport=\{(u1, v1), (v1, u1), \ldots, (un,vn), (vn, un)\}$ and $nport(ui,vi)=nport(vi,ui)$ is the number of ingoing/outgoing ports between ui and vi. Eopt is the set of links connecting optical nodes: in this case $nopt(vi, vj)=nopt(vj,vi)$ is the number of available wavelengths between vi and vj (given by the product of the number of optical fibers between vi and vj and the number of wavelengths on each fiber). Links are bi-directional: that is, when two nodes i and j are connected by a link, there are both the links (i,j) and (j,i). As mentioned above, each link is composed by a fixed number of several (parallel) channels (nport(i,j) and nport(j,i), or nopt(i,j) and nopt(j,i), for the two sets of links Eport or Eopt respectively). Each channel is assumed to have a capacity w, that is either the capacity of each port or the bandwidth available on each wavelength. Each channel is therefore a finite resource having a particular maximum capacity. Each LSR has a given number of ports which can at any given instant handle a particular bandwidth of traffic, and each wavelength has a particular bandwidth capacity.

A lightpath l going from an LSR ui to an LSR uj may be described as $\{ui, vi, P, vj, uj\}$, where $P \subseteq Eopt$ is a path from vi to vj in the optical layer. The lightpath l will reserve (and not share): one port between ui and vi; one wavelength from each optical link in P; one port between vj and uj. Since each OXC has full wavelength conversion capabilities, the wavelengths that l reserves on each link in P may be different. A consistent sequence of lightpaths $l1, \ldots, lk$, (that is, such that the origin of $li+1$ is the destination of li) is called a logical path.

A demand is received by the routing engine and comprises a set K of traffic requests. Three fields describe each traffic request: sk, tk, bk that are respectively the LSR-source, the LSR-destination and a requested bandwidth of traffic request $k \in K$.

With regard to failures taken into account by the routing engine, any network element may fail, one or more failures can be considered concurrently however for the sake of simplicity we consider only the failure of an optical link, and no more than one at a time.

In summary, we define the following variables:
Nel:=the set of LSR-s nodes
Nopt:=the set of OXC-s nodes
Eopt:=the set of (directed) optical links
Eport:=the set of (directed) intra-ports links
nopt(i,j):=the number of wavelengths in $(i,j) \in Eopt$
nport(u,v):=the number of incoming/outgoing intra-ports in $(u,v) \in Eport$
w=bandwidth available on a wavelength/intra-port
K:=the set of traffic requests
sk-tk-bk:=respectively LSR-source, LSR-destination and requested bandwidth of traffic request $k \in K$
$S:=\{s0, \ldots, sm\}$ the set of failure scenarios. s0 is the working scenario, $m=|Eopt|/2$
L:=the set of candidate lightpaths to be set-up
Lopt(i,j):=the set of lightpaths $\in L$ using $(i,j) \in Eopt$
Lport(u,v):=the set of lightpaths $\in L$ using $(u,v) \in Eport$ $L+(u)$ := the set of lightpaths ∈L starting from node u∈Nel
$L-(u)$ := the set of lightpaths ∈L ending in node u∈Nel
$L(s)$ := the set of lightpaths ∈L failing in the scenario s∈S (with $L(s0)=\emptyset$)

The decision variables are the following:

$$x_k = \begin{cases} 1 & \text{if } k \text{ is served} \\ 0 & \text{else} \end{cases} \quad \forall k \in K$$

$$y_l = \begin{cases} 1 & \text{if } l \text{ is set-up} \\ 0 & \text{else} \end{cases} \quad \forall l \in L$$

$$z_{kls} = \begin{cases} 1 & \text{if } k \text{ is routed on } l \text{ in scenario } s \\ 0 & \text{else} \end{cases}$$

$\forall k \in K, \forall s \in S, \forall l \in L \setminus L(s)$

The problem to be solved by the routing engine is therefore the following:

$$\text{Max} \sum_{k \in K} x_k$$

s.t.

$$\sum_{l \in L_{opt}(ij)} y_l \leq n_{opt}(i,j) \quad \forall (i,j) \in E_{opt} \quad (1)$$

$$\sum_{l \in L_{port}(uv)} y_l \leq n_{port}(u,v) \quad \forall (u,v) \in E_{port} \quad (2)$$

$$\sum_{l \in L^+(s_k)} z_{kls} - \sum_{l \in L^-(s_k)} z_{kls} = x_k \quad \forall k \in K, \forall s \in S \quad (3)$$

$$\sum_{l \in L^+(u)} z_{kls} - \sum_{l \in L^-(u)} z_{kls} = 0 \quad \forall k \in K, \forall u \in N_{el}, u \neq s_k, t_k$$

$$\sum_{k \in K} b_k z_{kls} \leq w y_l \quad \forall s \in S, \forall l \in L \setminus L(s) \quad (4)$$

$$z_{kls_0} \leq z_{kls} \quad \forall k \in K, \forall s \in S, \forall l \in L \setminus L(s) \quad (5)$$

$$x_k \in \{0,1\} \quad \forall k \in K \quad (6)$$
$$y_l \in \{0,1\} \quad \forall l \in L$$
$$z_{kls} \in \{0,1\} \quad \forall k \in K, \forall s \in S, \forall l \in L \setminus L(s)$$

And in relation to $x_k \forall s \in S$

The objective is to maximize the number of served traffic requests, subject to the following constraints:
the total number of lightpaths using the optical link (i,j) does not exceed the number of available wavelengths,
the total number of lightpaths using an intra-port between LSR u and OXC v does not exceed the number of available intra-ports,
flow-constraints for k in scenario s,
the total amount of traffic passing through each lightpath in each scenario does not exceed the capacity of the lightpath itself, and
if k is routed on a lightpath l in the working scenario, it must be routed on l in each scenario l is active.

The routing engine is configured to perform the following steps:
a. A provisioning step: where paths for the working scenario are searched;
b. A recovery step: where paths for the failure scenarios are searched;
c. A local search step: where local improvements are searched.

Therefore, first a primary path is searched for each traffic request. Then once all primary paths are determined the back-up paths are determined. This is likely to be a "fairer" method, since back-up paths are found while taking into account the complete primary paths configuration.

Details of each step are given below. It will be appreciated that lightpaths and LSPs are determined concurrently.

Provisioning Step

First, the traffic requests are sorted according to non-decreasing values of:

$B(k) = \text{MinHop}(k) * b_k$

MinHop(k) is the minimum number of hops from the source to the destination of LSP k, while $b_k$ is the bandwidth requested by k. B(k) is therefore a lower bound on the bandwidth reserved for the working path of k. This is because the goal is to serve as many traffic requests as possible, and it is therefore reasonable to stick to this ordering. In case different objectives are required (e.g. to maximize the bandwidth that is served in terms of traffic request) different ordering can be considered Then, each traffic request k is considered and the routing engine searches for a primary path, taking into account: 1) the source LSR, the destination LSR and the bandwidth of k; 2) the primary path of each traffic request that has been considered before k (and has not been discarded); 3) the set of lightpaths set-up so far. If such a path is not found, then the traffic request is temporary discarded: it will try to accommodate it during the local search step.

Recovery Step

After the provisioning step, a working path has been defined for a set of traffic requests, let Q be the set of LSPs of such traffic requests. The objective is now to find a back-up path for each LSP in Q and for each failure scenario.

The first step is that of ordering the different failure scenarios. Each failure scenario is defined by the failure of an optical link; therefore, it is possible to sort them according to non-increasing values of the load of this link. Each scenario is now considered: say the current scenario s (associated with a (bi-directional) link e).

The problem is now that of finding back-up paths for the LSPs in Q∩LSP(s). In fact, by definition, an LSP that is not in LSP(s) is not affected by the failure of e, and therefore it is still routed on its primary path. The LSPs in Q∩LSP(s) are ordered according to non-decreasing values of the bandwidth $b_k$. However, different ordering criteria can be applied in case a different objective function needs to be considered.

Finally, each LSP k in Q∩LSP(s) is considered. Let $(l_1, \ldots, l_p)$ be the sequence of lightpaths for the primary LSP, with e∈$l_i$. The routing engine searches for a back-up path for LSP, i.e. an alternative path for lightpath taking into account: 1) the source and the destination of lightpath $l_i$ and the bandwidth of B(k); 2) the working path of each LSP; 3) the back-up path of each LSP in Q∩LSP(s) that has been considered before k; 4) the set of lightpaths set-up so far. If such a path is not found, then LSP is temporary discarded and it is removed from Q (hence, all the resources so far reserved for it are realised). The procedure continues by considering all LSPs in Q∩LSP(s) and all scenarios.

Local Search Step

The main goal of this step is to serve traffic requests that have been discarded in the previous two steps, with a greedy approach based on some simple exchange rules. Let K' be the set of discarded traffic requests after the first Q steps. Let Q (Q') be the set of served (discarded) LSPs after the first two steps. First of all, traffic requests in K' are sorted according to non-decreasing values of the bandwidth bk'

Let Q be a traffic request in K'. The routing engine tries to accommodate k' by considering the LSPs in Q one by one.

So let k be an LSP in Q. All the resources so far reserved for k are released, and the corresponding traffic request k has to be accommodated again. The routing engine tries to accommodate k' and k according to the following rules:

1. Search a working path for k' and then a (new) working path for k (as in the provisioning step). If both paths are found go to step 2, else quit.
2. Search back-up paths for Q of k and for Q' of k' (as in the recovery step). If back-up paths are found (for Q, Q' and for each scenario) go to step 3, else quit.
3. Set Q'=Q'\{k'}, Q=Q∪{k'}.

This is done until, for some LSP Q in Q, the third step of the solution is reached (if this is never the case, k' is discarded again). The next traffic request from K' is then considered.

Each time a path has to be found for some traffic request k—either a working path from $s_k$ to $t_k$ in the provisioning step, or an alternative path for some failed lightpath h used by k in the recovery step—this is achieved by solving a shortest path problem (e.g. by Dijkstra's algorithm) on an auxiliary network G(N,E') where $N=N_{el} \cup N_{opt}$, while $E'=E_{port} \cup E_{opt} \cup E_{lig}$. $E_{lig}$ is a set of directed links between LSRs, representing lightpaths already established, whose spare bandwidth for the current scenario is at least $b_k$ (at the beginning of the procedure, while considering the first traffic request in the first iteration, $E_{lig}=\emptyset$). The auxiliary network is a single layer equivalent network representative of the totality of the network resources of the multi-layer network considered. The links in the auxiliary network are called edges.

Each arc has a weight. The weight of an arc in $E_{port} \cup E_{opt}$ is defined as in Nilesh M. Bhide, Krishna M. Sivalingam, Tibor Fabry-Asztalos "Routing Mechanisms Employing Adaptive Weight Functions for Shortest Path Routing in Optical WDM Networks", Journal of Photonic Network Communications, vol. 3, no. 3, pp. 227-236, 2001. $n'(v_i,v_j)$ and $n'(u_i,v_i)$ are respectively the number of wavelengths between $v_i$ and $v_j$ (ports between $u_i$ and $v_i$) that are currently available: they are evaluated taking into account the set of lightpaths set-up so far. The weight $\omega(v_i,v_j)$ of $(v_i,v_j) \in E_{opt}$ is given by:

$$\omega(v_i v_j) = \begin{cases} 1 - \beta \ln\left(1 - \frac{1}{n'(v_i, v_j)}\right) & \text{if } n'(v_i, v_j) > 1 \\ 1 + \beta & \text{if } n'(v_i, v_j) = 1 \\ \infty & \text{if } n'(v_i, v_j) = 0 \end{cases}$$

where $\beta \in (0,1)$ is a parameter used for tuning the weight of link congestion. Analogously, the weight $\omega(u_i,v_i)$ of an arc $(u_i,v_i) \in E_{port}$ is given by:

$$\omega(u_i v_i) = \begin{cases} \gamma - \gamma\beta\ln\left(1 - \frac{1}{n'(u_i, v_i)}\right) & \text{if } n'(u_i, v_i) > 1 \\ \gamma + \gamma\beta & \text{if } n'(u_i, v_i) = 1 \\ \infty & \text{if } n'(u_i, v_i) = 0 \end{cases}$$

where γ is a parameter used for tuning congestion. The parameter γ is generally greater than one, because the number of outgoing/incoming ports is often a bottleneck in a network.

Finally, the weight $\omega(u_i,u_j)$ of an arc $(u_i,u_j) \in E_{lig}$ is equal to the number of hops of the corresponding lightpath. It is to be noted that the number of scenarios where a lightpath is down is equal to this number. It will be appreciated that different weights functions can be considered accordingly to the required network operator policy. The functions can be configured by the network operator as input data.

A (shortest) path P from $s_k$ to $t_k$ on this auxiliary network is a sequence of different types of edges. For example, suppose that P={$(u_1,u_2)$, $(u_2,v_2)$, $(v_2,v_3)$, $(v_3,v_4)$, $(v_4,u_4)$}, with $s_k=u_1$ and $t_k=u_4$. That means that the LSP Q of the traffic request k will be routed on two lightpaths: the first one is from LSR $u_1$ to LSR $u_2$ and was established in a previous iteration; the second one is new, it goes from $u_1$ to $u_2$ and uses the optical links $(v_2, v_3)$ and $(v_3, v_4)$. Therefore, in the next iteration there will be a new edge $(u_2,u_4) \in E_{lig}$, while the number of available wavelengths on the edges $(v_2,v_3)$ and $(v_3,v_4) \in E_{opt}$ and the number of available ports on the edges $(u_2,v_2)$ and $(v_4,u_4) \in E_{port}$ will be decreased by one. In this way, the procedure concurrently designs the logical topology, by selecting the lightpaths and their routes on the physical topology, and the routing of each LSP onto the logical topology.

Once the primary paths and the back-up paths have been determined by the routing engine and have established by suitably configuring the LSRs and the OXCs in the network by way of control signals from the network control apparatus, the data flows corresponding to the LSR requests enter the network by the respective LSRs. In the situation of the failure a back-up path is provided for any LSP within each lightpath in that failed link. The earlier configuration of the OXCs by the network control apparatus 10 causes the OXCs to determine which data flows received thereby are protected (by way of recognising a label information of the flows). The OXCs will then cause those flows to be directed along the determined back-up paths and so bypass the failed link.

Figure 2:
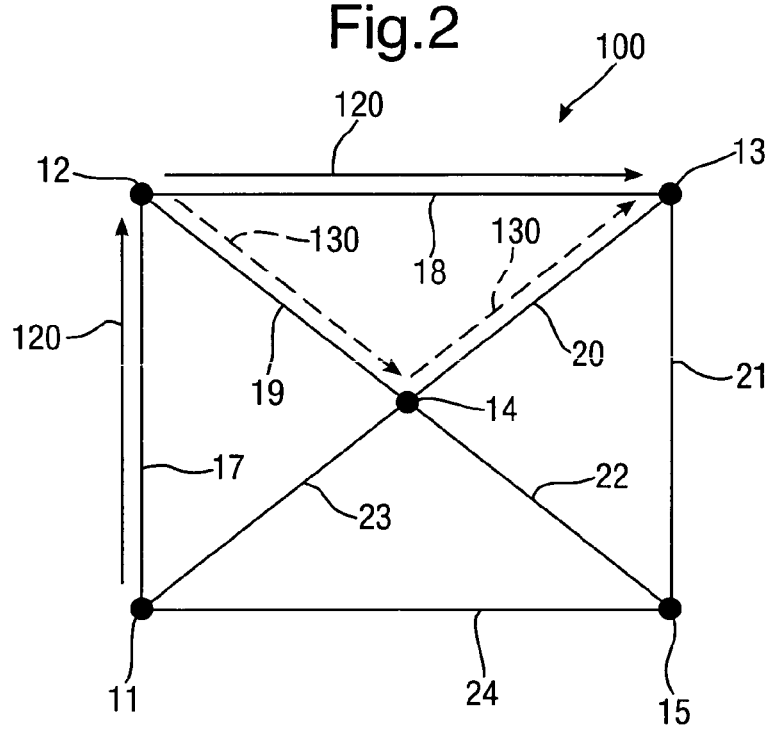
FIGS. 2 and 3 show a telecommunications circuit.
Figure 3:
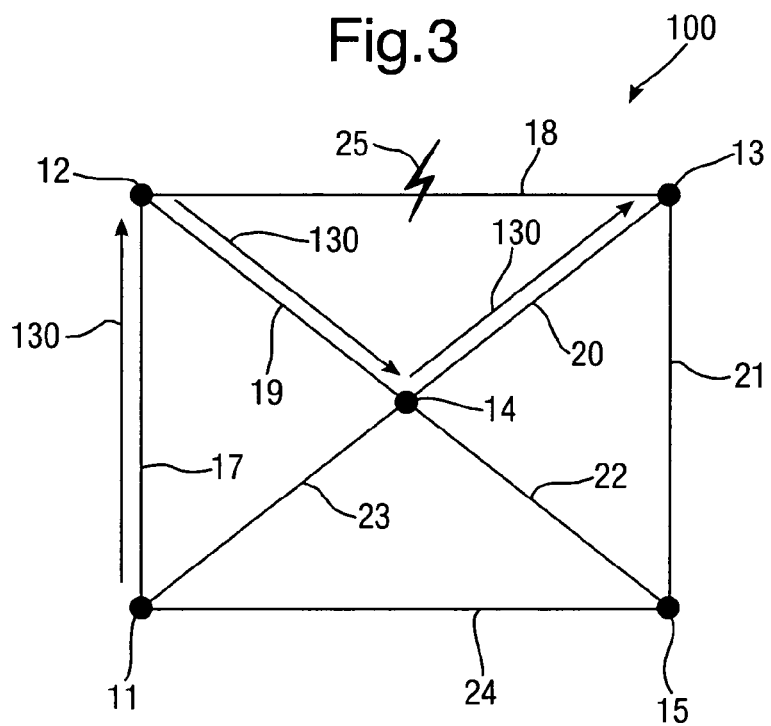

Reference is made to FIGS. 2 and 3 which show part of a multi-layer network 100 of the type generally shown in FIG. 1. The network 100 comprises OXCs 11, 12, 13 14 and 15. The OXCs are interconnected by the optical links 17, 18, 19, 20, 21, 22, 23 and 24. The network also comprises a plurality of LSRs (not illustrated) and a plurality of intra-port links (not illustrated) which connect the LSRs to the OXCs. In the simplified scenario shown the routing engine has determined a primary path 120 for a particular traffic flow which starts at OXC 11, along optical link 17, to OXC 12, along optical link 18 and reaching its destination OXC 13. The routing engine has also determined a back-up path for the LSP of which involves link 17 to OXC 12 and then along optical link 19 to OXC 14 and then along optical link 20 to the OXC 13. In FIG. 3, a fault 25 has occurred in the optical link 18 and so the traffic flow is directed along the back-up path 130. It will be appreciated that a different respective back-up path could be provided for different LSPs which utilise the same failed lightpath.

FIG. 4 shows a flow diagram 200 which summarises the steps 201 to 207 performed by the routing engine, the step 208 of configuring the network in accordance with the output of the routing engine, the step 209 of introducing the traffic flows into the network on the determined primary paths, and the steps 210 and 211 which are taken when a link failure is detected.

Numerous important advantages result from the above described apparatus and method for routing.

An increased flexibility allowing a network operator to protect each LSP with the desired level of protection, independently of the aggregation of LSPs according to the network scenario in question. So the granularity could be as fine as it is desired by the operator policy.

Distribution of the Traffic Evenly Over the Network Limiting Congestion

The above routing arrangement is compliant with current and standard control plane/management systems.

Scalability allows the network operator to vary the granularity of the protection from LSP to lightpath. In other words, such a strategy provides protection for heterogeneous flows such as single LSP within a lightpath, or a lightpath within fiber or port of a node.

Increased efficiency allows protection all LSPs which require protection, with the required diversification, while consuming a minimum amount of network resources. This because the proposed solution, taking advantage by the knowledge of the status of the resources at each layer and by the optimization, finds the best solution with a minimum amount of resources. The efficiency is also guaranteed by the sharing of resource due to the use of "failure scenario" concept. In addition the authors propose a procedure to increase the amount of traffic by a suitable sorting of traffic requests.

Minimization of traffic disruption is achieved because the failure detection and recovery is local (at lightpath level) and so occurs at high speed.

Multiple constraints on node and links (belonging to both layers) can be considered in determining the primary paths and the secondary paths.

Network operator policy can be taken into consideration, to achieve, for example, the minimization of congestion and/or uniform traffic distribution.

A failed link dependency (i.e. only bypassing a link which has failed) leads to accommodation more traffic with respect to a failed link independency methodology with a gain that varies between the 30%, when the network is heavily loaded, up to the 100% when the network is lightly loaded. Correspondingly, LSP-granularity allows accommodation of more traffic requests with a gain that varies from 25% up to 80% with respect to the lightpath-granularity, which is employed in WDM protection schemes.

It will be appreciated that any signal transmission/processing resource associated with either layer, the bandwidth of a link connecting nodes or the switching capacity of a node, for example, can advantageously be taken into consideration when determining routing.

The invention claimed is:

1. A method for determining routing for data which is to be transmitted over a multi-layer network, the network comprising a first layer of nodes, and a second layer of nodes, and the method comprising:
   a network management apparatus performing:
      determining routing by taking account of available signal transmission/processing resource associated with the first layer and available signal transmission/processing resource associated with the second layer;
      determining a plurality of primary paths; and
      after the primary paths have been determined, determining a plurality of back-up paths for at least one of the primary paths, taking into account a complete configuration of the primary paths,
   wherein determining the plurality of back-up paths for the at least one of the primary paths comprises searching for an alternative path for a lightpath used in the at least one of the primary paths taking into account:
      a source and destination of the lightpath used in the at least one of the primary paths;
      a working path of each virtual path in the first layer of nodes;
      each previously considered back-up path of one or more virtual paths in the first layer of nodes; and
      a set of lightpaths that have been set-up so far.

2. The method as claimed in claim 1, comprising determining a number of back-up paths which is equal to the number of links in the second layer of a primary path.

3. The method as claimed in claim 1, comprising configuring the network for a particular primary path whilst at the same time determining at least one further primary path and/or determining at least one back-up path.

4. The method as claimed in claim 1, comprising taking account of remaining signal transmission resource which remains after resource has already been allocated for previously determined paths.

5. The method as claimed in claim 1, in which the nodes of the first layer are arranged to be capable of allowing ingress and egress of data to and from the nodes of the second layer.

6. The method as claimed in claim 1, in which the nodes of the first layer comprise routers.

7. The method as claimed in claim 6, in which the signal transmission resource associated with the routers comprises available port capacity of ports of the routers which allow communication between the routers and the nodes of the second layer.

8. The method as claimed in claim 1, in which the nodes of the second layer comprise optical switches.

9. The method as claimed in claim 8, wherein the optical switches are connected by optical links and the signal transmission resource of the optical links comprises available bandwidth.

10. The method as claimed in claim 1, in which the nodes of the first layer comprise electrical nodes and the nodes of the second layer comprise optical nodes.

11. The method as claimed in claim 1, which comprises taking account of the available data granularity of the signal transmission resources.

12. The method as claimed in claim 1, which comprises determining the at least one primary path and the plurality of back-up paths before the data is transmitted over the network.

13. A method as claimed in claim 1, comprising processing a plurality of requests for transmission of data flows, ordering the requests in relation to a measure of at least one of (i) a bandwidth of each request and (ii) the number of links of the network which need to be used to transmit a data flow from an origin node of the network to a destination node of the network.

14. The method as claimed in claim 1, which is suitable for use with at least one of Multiple Label Protocol Switching and Generalised Multiple Label Protocol Switching.

15. Network management apparatus for a multi-layer network comprising a first layer of nodes, a second layer of nodes, the network management apparatus comprising:
   a data processor which is arranged to:
      determine routing by taking account of available signal transmission/processing resource associated with the first layer and available signal transmission/processing resource associated with the second layer;
      determine a plurality of primary paths; and
      after the primary paths have been determined, determine a plurality of back-up paths for at least one of the primary paths, taking into account a complete configuration of the primary paths,
wherein the data processor is arranged to determine the plurality of back-up paths for the at least one of the primary paths by searching for an alternative path for a lightpath used in the at least one of the primary paths taking into account:
a source and destination of the lightpath used in the at least one of the primary paths;
a working path of each virtual path in the first layer of nodes;
each previously considered back-up path of one or more virtual paths in the first layer of nodes; and
a set of lightpaths that have been set-up so far.

16. A network comprising the network management apparatus of claim 15.

17. A network as claimed in claim 16, in which the nodes of the first layer are arranged to receive the data to be transmitted over the network as electrical signals and are further arranged to receive electrical signals relating to data which has been transmitted over at least part of the network.

18. A network as claimed in claim 16, in which the nodes of the second layer comprise optical cross-connect apparatus.

19. A non-transitory machine-readable storage medium having stored thereon instructions for a data processor, and the instructions, when run by the data processor, result in routing for data which is to be transmitted across a multi-layer network, the network comprising a plurality of nodes of a first layer, a plurality of nodes of a second layer, the instructions being such that the data processor performs:
determining routing by taking account of available signal transmission/processing resource associated with the first layer and available signal transmission/processing resource associated with the second layer;
determining a plurality of primary paths; and
after the primary paths have been determined, determining a plurality of back-up paths for at least one of the primary paths, taking into account a complete configuration of the primary paths,
wherein determining the plurality of back-up paths for the at least one of the primary paths comprises searching for an alternative path for a lightpath used in the at least one of the primary paths taking into account:
a source and destination of the lightpath used in the at least one of the primary paths;
a working path of each virtual path in the first layer of nodes;
each previously considered back-up path of one or more virtual paths in the first layer of nodes; and
a set of lightpaths that have been set-up so far.

* * * * *